US008892721B2

(12) United States Patent
Anderson et al.

(10) Patent No.: US 8,892,721 B2
(45) Date of Patent: Nov. 18, 2014

(54) POWER MONITORING SYSTEM WITH PROXY SERVER FOR PROCESSING AND TRANSFORMING MESSAGES AND CONTEXT-SPECIFIC CACHING

(75) Inventors: David Anderson, Victoria (CA); John C. Van Gorp, Sidney (CA)

(73) Assignee: Schneider Electric USA, Inc., Palatine, IL (US)

( * ) Notice: Subject to any disclaimer, the term of this patent is extended or adjusted under 35 U.S.C. 154(b) by 781 days.

(21) Appl. No.: 12/650,640

(22) Filed: Dec. 31, 2009

(65) Prior Publication Data

US 2011/0161402 A1     Jun. 30, 2011

(51) Int. Cl.
| | | |
|---|---|---|
| *G06F 15/173* | (2006.01) | |
| *G01R 21/00* | (2006.01) | |
| *G06F 11/00* | (2006.01) | |
| *H04L 29/08* | (2006.01) | |
| *H04L 12/26* | (2006.01) | |
| *H04L 12/24* | (2006.01) | |

(52) U.S. Cl.
CPC ........ *H04L 43/0817* (2013.01); *H04L 67/2857* (2013.01); *H04L 41/0213* (2013.01); *H04L 67/125* (2013.01); *Y04S 40/168* (2013.01)
USPC ............. 709/224; 709/223; 702/62; 702/188

(58) Field of Classification Search
USPC ............. 709/203, 223, 224, 227; 702/57, 62, 702/187, 188
See application file for complete search history.

(56) References Cited

U.S. PATENT DOCUMENTS

| | | | |
|---|---|---|---|
| 6,253,234 B1 * | 6/2001 | Hunt et al. ..................... | 709/213 |
| 6,904,391 B2 * | 6/2005 | Merkin et al. ................ | 702/188 |
| 7,127,328 B2 | 10/2006 | Ransom | |
| 7,188,003 B2 | 3/2007 | Ransom et al. | |
| 7,216,043 B2 | 5/2007 | Ransom et al. | |
| 7,248,978 B2 | 7/2007 | Ransom | |
| 7,447,762 B2 | 11/2008 | Curray et al. | |
| 2004/0246901 A1 * | 12/2004 | Zhang et al. ................... | 370/238 |
| 2005/0021296 A1 * | 1/2005 | Aritsuka et al. .............. | 702/183 |
| 2006/0020616 A1 * | 1/2006 | Hardy et al. .................. | 707/101 |
| 2008/0151892 A1 * | 6/2008 | Arena ........................... | 370/392 |
| 2008/0208367 A1 * | 8/2008 | Koehler et al. ................ | 700/19 |
| 2009/0245224 A1 * | 10/2009 | Iyer et al. ...................... | 370/345 |
| 2010/0162013 A1 * | 6/2010 | Oh et al. ....................... | 713/310 |

* cited by examiner

*Primary Examiner* — Brian J Gillis
(74) *Attorney, Agent, or Firm* — Lando & Anastasi, LLP

(57) ABSTRACT

An electrical power monitoring system includes a proxy server between (1) monitoring devices coupled to an electrical power distribution system for sensing and storing data representing operating characteristics of the power distribution system, and (2) at least one client device coupled to the monitoring devices for requesting data from the monitoring device and processing, storing and presenting data received from the monitoring devices. A communications network is coupled to the monitoring and client devices, and proxy server is coupled to the communications network for processing and transforming messages and context-specific caching. The proxy server receives messages from the client device as a virtual device, processes the messages, and alters the messages before communicating the messages to the monitoring devices to which the messages are directed, or defers communication of at least portions of the messages to the actual monitoring devices to which the requests are directed until a later time.

13 Claims, 3 Drawing Sheets

POWER MONITORING SYSTEM WITH PROXY SERVER FOR PROCESSING AND TRANSFORMING MESSAGES AND CONTEXT-SPECIFIC CACHING

FIELD OF THE INVENTION

The present invention relates generally to power monitoring systems and, more particularly, to a power monitoring system having a proxy server between the monitoring devices and multiple client devices for processing and transforming messages and context-specific caching.

BACKGROUND

Standard web proxy servers have been used in power monitoring systems to exchange data via XML-formatted messages. For example, Ransom U.S. Pat. No. 7,127,328 describes the use of a standard web proxy to cache HTML documents while keeping a digital signature intact. Another example is Ransom U.S. Pat. No. 7,248,978 which describes the ability of standard web proxy servers to inspect messages and filter them based on either the content or destination of the messages. U.S. Pat. No. 7,447,762 describes the presence of a proxy server in a network connected to a monitoring system and notes that the presence of the proxy server can cause difficulties with an IP-based security scheme.

A principal object of the present invention is to provide a power monitoring system with a specialized proxy server that enhances the performance of the power monitoring system.

BRIEF SUMMARY

The present disclosure provides a power monitoring system having a proxy server between at least one monitoring device and at least one client device for processing and transforming messages and context-specific caching.

In one implementation, an electrical power monitoring system comprises at least one monitoring device coupled to an electrical power distribution system for sensing and storing data representing operating characteristics of the power distribution system. At least one client device is coupled to the at least one monitoring device for requesting data from the at least one monitoring device and processing, storing and presenting data received from the at least one monitoring device. A communications network is coupled to the monitoring and client devices, and a proxy server is coupled to the communications network for receiving messages from at least one client device as a virtual device, processing the messages, and altering the messages before communicating the messages to the monitoring device to which the messages from at least one client device are directed.

In another implementation, the a proxy server coupled to the communications network responds to messages from at least one client device as a virtual device and defers communication of at least portions of the messages to the actual monitoring device to which the requests are directed until a later time.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
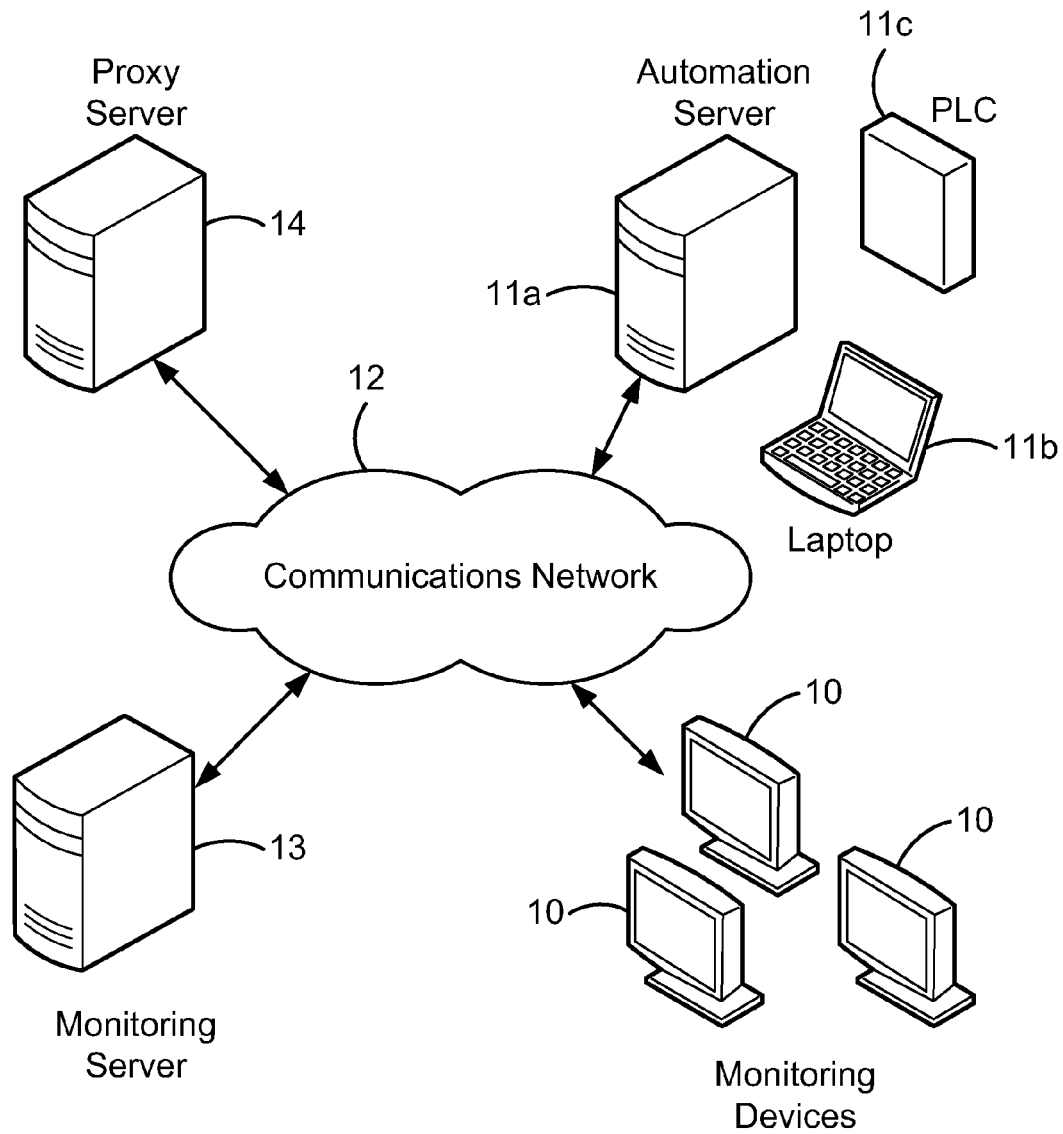
FIG. 1 is a diagrammatic illustration of an electrical power monitoring system in which a communications network interconnects client devices with monitoring devices, a monitoring server and a proxy server.

Turning now to the drawings and referring first to FIG. 1, a power monitoring system includes multiple power monitoring devices 10 that measure various characteristics of the electrical signal (e.g., voltage, current, waveform distortion, power, etc.) passing through power line conductors, and the data from each monitoring device is analyzed by the user to evaluate potential performance or quality-related issues. Each monitoring device 10 typically includes a controller, firmware, a memory, a communications interface, and connectors that connect the monitor to the power line conductors. The firmware generally includes machine instructions for directing the controller to carry out operations required for the monitoring device, and the memory stores the electrical parameter data measured by the monitoring device.

The monitoring devices 10 communicate with various types of client devices 11, such as an automation server 11a or a portable computer 11b or a programmable logic controller (PLC) 11c, through a communications network 12. Both the monitoring devices 10 and the client devices 11 also communicate with a monitoring server 13 and a proxy server via the communications network 12.

The proxy server 14 is coupled to the communications network 12 for receiving messages from the client devices 11 as a virtual device, processing and altering the messages before communicating them to the monitoring devices 10 to which the messages are directed. If a message includes configuration changes for the monitoring devices, the proxy server may acknowledge the configuration changes but delay communication of the configuration changes to the monitoring devices until a later time based on the status of the monitoring devices. If the proxy server 14 receives messages from multiple client devices for the same monitoring device, the proxy server can manage the communication of those messages to the designated monitoring device.

The proxy server 14 may be configured to act as a proxy for all the monitoring devices 10 or just selected devices. The proxy server 14 may also be configured to act as a proxy for one or more TCP/IP protocols, examples of which include HTTP, FTP, SMTP, SNMP, instant messaging protocols (such as XMPP), DPWS and/or Modbus TCP.

The client devices 11 may be explicitly configured to use the proxy server 14 for communications with the monitoring devices 10, or traffic between the client devices 11 and the monitoring devices 10 may be automatically and "transparently" routed through the proxy server 14. Although FIG. 1 illustrates the proxy server 14 and the optional monitoring server 13 as separate components, the monitoring server 13 and the proxy server may be integrated in a single device.

Services provided by the proxy server 14 may include the following:

Protocol conversion: The proxy server 14 translates a client request issued in one protocol to another protocol supported by a selected monitoring device 10, and translates the monitoring device response into the protocol supported by the client device.

Caching: A record is kept of all client requests and the associated responses from the monitoring devices 11 over a predetermined time period. When a client request is received, the proxy server 14 checks its cache to see if it has an appropriate response from a previous, similar request. If the monitoring device response is older than a predetermined age limit, the proxy server 14 passes the request to the monitoring device 10 and refreshes the cache with the latest response. The age limit may be manually configured, or stored on the monitoring device 10 and retrieved by the proxy server 14, or determined by some property of the data in the response from the monitoring device 10. Alternatively, instead of storing the complete monitoring device response message, the proxy server 14 may extract and store the data contained within the response. Storing the data directly allows the proxy server 14 to build a response message using the same protocol as used in the client request. The proxy server 14 can also (1) determine the type of message received from the client devices and, based on that determination, manage the communication of the message to the monitoring devices or to caches associated with the monitoring devices, and (2) determines whether messages received from the client devices are commands or requests for logged data, communicate commands directly to the monitoring devices, and communicate requests for logged data to caches.

Message filtering: Client requests that do not match a predetermined set of requests supported by a monitoring device 10 are not forwarded to the monitoring device. The proxy server 14 may provide an appropriate error message response to the client device 11 making the request, or may not provide any response at all. Conversely, client requests that do match a predetermined set of requests are not forwarded to the monitoring device 10.

Message modification: The proxy server 14 may make slight modifications to client requests and monitoring device responses before passing them on. In one example, the proxy server 14 corrects malformed requests that may otherwise lead to undesired monitoring device behaviour. In another example, the proxy server 14 may "tweak" timestamps in monitoring device responses in order to "snap" them to intervals (such as quarter-hour intervals) expected by the client.

Device masquerading: Some clients may support communications with particular models of monitoring devices 10 in a family of devices, but not communications with others. Alternatively, some clients may support the request messaging required for a set of data from one monitoring device, but not support the request messaging required for the same set of data from another monitoring device. The proxy server 14 may process client requests and monitoring device responses such that a monitoring device can "masquerade" as another device supported by a client.

Backup monitoring devices: Monitoring applications requiring high reliability sometimes use two or more monitoring devices 10 at the same monitoring point. The proxy server 14 can be configured to normally direct requests to the primary monitoring device 10 but switch to the a backup monitoring device 10 if predetermined conditions are met (such as receiving no response from the primary device after N attempts).

Encryption: The proxy server 14 may provide secure communications between client devices 11 that support encryption and monitoring devices 10 that do not. The proxy server 14 decrypts requests from the client devices 11 and encrypts responses sent back to the client devices 11.

Compression: The proxy server 14 may provide data compression between client devices 11 supporting compression and monitoring devices 10 that do not. The proxy server 14 decompresses requests from the client devices 11 that support compression and compresses responses sent back to the client devices. 11

The monitoring devices 10 may structure a representation of data stored in memory in such a way as to seamlessly allow the proxy server 14 with caching capabilities to create a permanent record of the data. This approach is described in more detail below in the following examples of interactions among the monitoring devices 10, the proxy server 14, and the client devices 11:

The monitoring devices 10 offer data as structured web documents (such as XML documents). A Uniform Resource Identifier (URI) structure is used to organize the presentation of the web documents. As an example, a collection of real-time readings might be accessible at http://monitor_ID/now (or /monitor_ID/2009/06/01/now.xml), and a collection of daily summary data might be accessible at /monitor_ID/2009/06.

The proxy server 14 is configured to cache the structured web documents from the monitoring devices 10 when those documents are requested. The proxy server 14 is configured to update its cache when the document located at a particular URI is updated, and to keep a permanent record in cache once the document stops updating. As an example, the proxy server 14 continuously updates its cache record of interval data located at http://monitor_ID/2009/06/01/logs.xml throughout the day, and maintains the cache record of that interval data once the day has passed.

Requests from the client devices 11 for structured web documents on a monitoring device 10 are handled by the proxy server 14, which either (a) serves up a copy from its cache, if the document on the monitoring device has not changed, or (b) acquires the latest copy from the monitoring device, updates its cache, and then serves the document to the client device that generated the request. As an example, a web application requests /monitor_ID/2009/06/01 from the monitoring device, and the proxy server 14 responds with the data stored in its cache. The web application applies a style template to the received structured data and presents a formatted web page to a user.

This approach simplifies client access to data generated by the monitoring devices 10, removing the distinction between data stored on monitoring device s 10 and data archived on a server. A client device 11 no longer needs to determine whether the data is stored on the device or archived elsewhere—instead, a simple request in a consistent format prompts the proxy server 14 to respond with the desired data. This approach also simplifies the creation of permanent archives of data on the monitoring devices 10 by only requiring that data be requested by client devices in order to trigger the archival. To ensure that all data to be archived is requested in a timely fashion, an automated request process may be scheduled at regular intervals.

Figure 2:
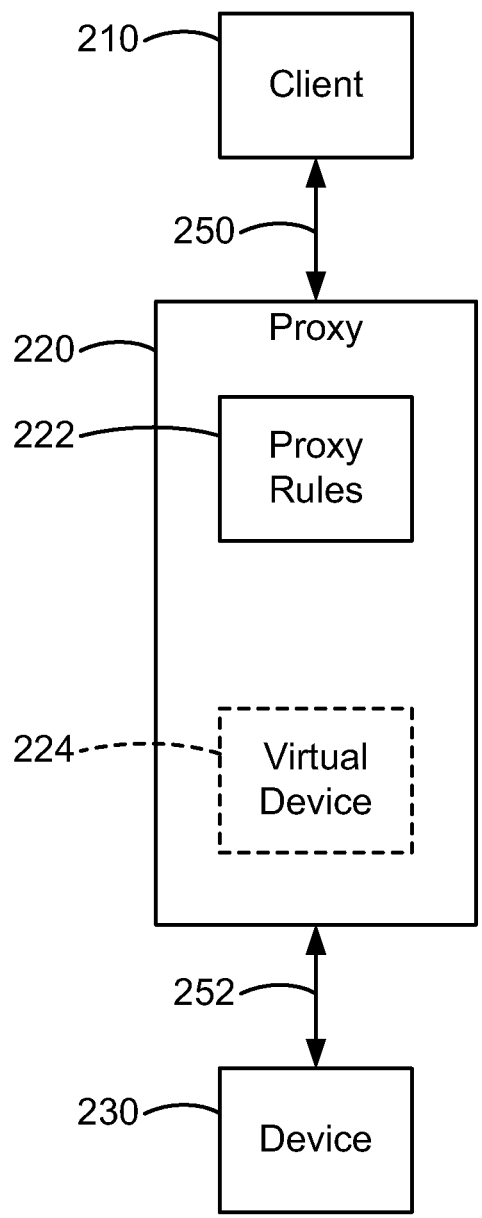
FIG. 2 is a block diagram illustrating interactions among the proxy server, a client device and a monitoring device in the system of FIG. 1.

FIG. 2 is a block diagram illustrating the role that the proxy server 14 plays in the interaction between clients and devices. When a client 210 issues a request destined for a device 230 along a communications channel 250, the request is intercepted by a proxy 220. The request may be for a set of data generated by the device 230, or it may be to change configuration parameters on the device 230. The client 210 may be explicitly configured to direct requests destined for the device 230 through the proxy 220, or the proxy 220 may be configured to transparently intercept all requests bound for the device 230 and act as an intermediary between the client 210 and the device 230.

When the proxy 220 intercepts a request destined for the device 230, the proxy 220 examines the request and applies proxy rules 222 to determine whether or not the request can be handled using a virtual device 224, which is a continuously updating, virtual model of the measurement and configuration data state of the device 230. If the virtual device 224 can be used, the proxy 220 applies the request (which may, for example, be a request for measurement data or a request to change a configuration parameter) to the virtual device 224 and sends a response to the client 210 using the communications channel 250. Alternatively, the proxy rules 222 may mandate that direct interaction with the device 230 is required, given the request received, in which case the proxy 220 sends the request to the device 230 using a communications channel 252 and forwards the response to the client 210.

Examples of rule elements that may be used by the proxy 220 include the following:

Type of request: a request to change specific configuration parameters may always be sent directly to a device, whereas requests for historical trend data may be serviced by measurement data stored in the associated virtual device.

Currency of virtual device: the proxy may service requests by communicating directly with a device if its associated virtual device state has not been updated within a predetermined amount of time.

Concurrent client requests: multiple requests for the same measurement data from a device may prompt the proxy to issue one request, update the associated virtual device and then provide responses to all clients from the virtual device. In a slightly different scenario, multiple requests for differing data subsets may prompt the proxy to issue one request for the superset of the data requested, update the associated virtual device and then provide the appropriate data subset to each client. In another example, if conflicting client requests are received, the proxy rules may specify the priority ranking of clients, directing the proxy to service requests based on priority.

Backup monitoring devices: monitoring applications requiring high reliability will sometimes use two or more monitoring devices at the same monitoring point. The proxy server 14 can be configured to normally interact with a primary monitoring device but switch to a backup monitoring device if predetermined conditions are met (such as receiving no response from the primary device after N attempts).

The communication channels 250 and 252 are different logical channels but may be established over the same physical communications network. The message protocol used between the client 210 and the proxy 220 over channel 250 may differ from the message protocol used between the proxy 220 and the device 230 over channel 252. When the proxy 220 receives a request, it interprets the nature of the request with a level of understanding sufficient to apply the proxy rules 222. This processing capability also allows the proxy 220 to receive a request from the client 210 in one message protocol and generate the corresponding request to the device 230 in another message protocol (and vice-versa when providing the response back to the client 210).

Figure 3:
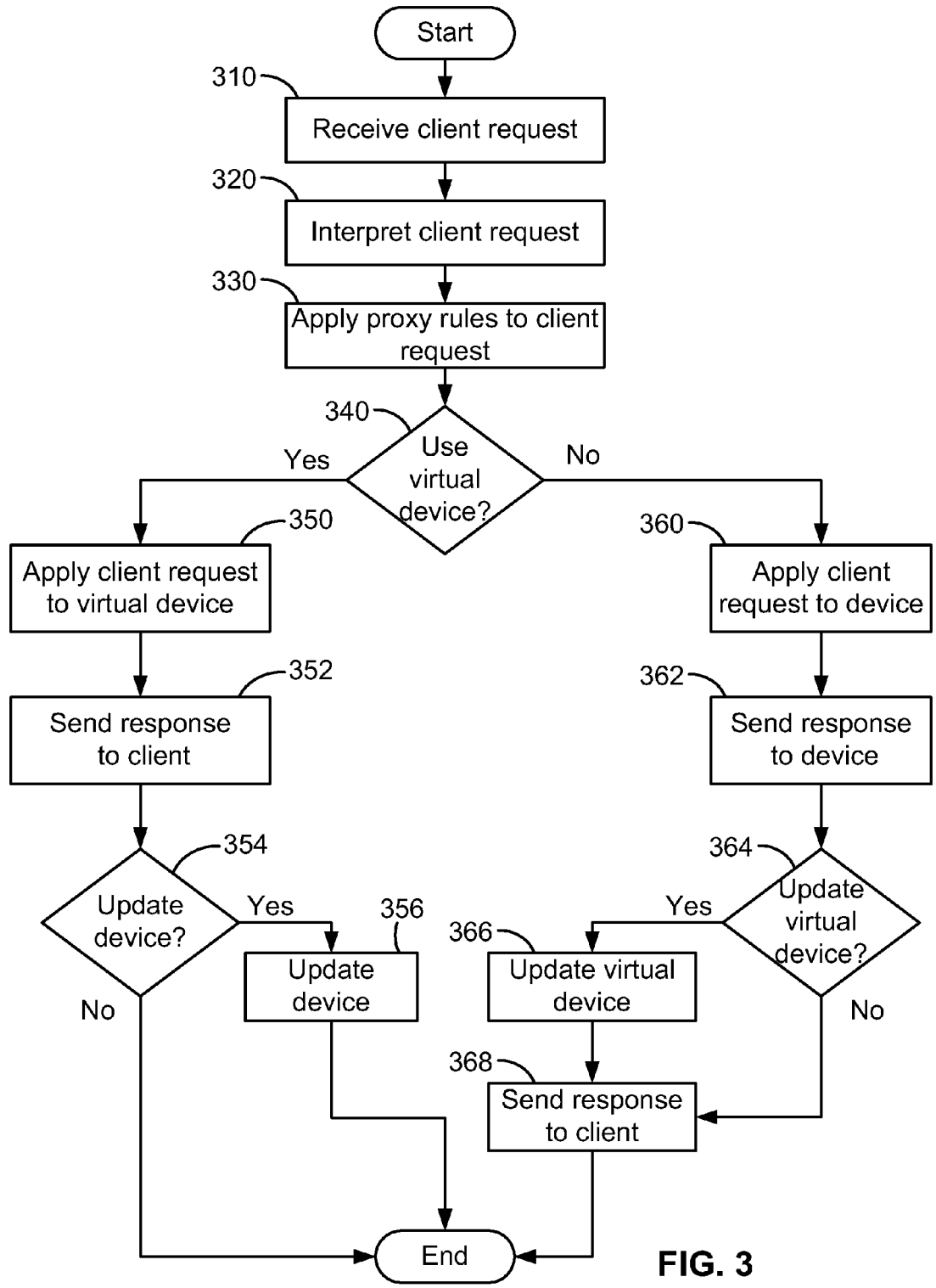
FIG. 3 is a flowchart illustrating the steps taken by the proxy server in the interactions illustrated in FIG. 2.

FIG. 3 is a flowchart illustrating the steps taken by a proxy server 14 acting as an intermediary between a client and a device. In step 310, the proxy server 14 receives a client request at step 310, and interprets the nature of the client request at step 320. The proxy server 14 uses this interpretation of the request at step 330 to apply predetermined proxy rules and determine what step to take next.

Step 340 determines whether the proxy rules specify that the virtual device state can be used to formulate a response. If the answer is affirmative, the proxy server 14 applies the client request to the virtual device at step 350. The proxy server 14 then obtains the data required and sends a response to the client at step 352. After sending the response, the proxy server 14 checks to see if the device needs to be updated at step 354. If the device needs to be updated, the proxy server 14 updates the device at step 356. As an example, a client request to make a minor device configuration change may be handled by updating the associated virtual device and providing a quick response before applying the configuration change to the device itself.

If the answer at step 340 is negative (the proxy rules specify that the virtual device state cannot be used to formulate a response), the proxy server 14 applies the client request to the device at step 360. After receiving a response from the device at step 362, the proxy server 14 determines whether the virtual device needs to be updated at step 364. If the virtual device state does not need to be updated, the proxy server 14 simply sends a response to the client at step 368. If the virtual device state does need to be updated, the proxy server 14 performs the update at step 366 before sending a response to the client at step 368.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An electrical power monitoring system for monitoring an electrical power distribution system, comprising:
    at least one monitoring device adapted to be coupled to said electrical power distribution system for sensing and storing data representing operating characteristics of said electrical power distribution system,
    at least one client device coupled to said at least one monitoring device for requesting data from said at least one monitoring device and processing, storing and presenting data received from said at least one monitoring device,
    a communications network coupled to said monitoring and client devices, and
    a proxy server coupled to said communications network for receiving client messages from said at least one client device as a virtual device that is a continuously updating, virtual model of the measurement and configuration data state of said at least one monitoring device, the proxy server
    processing said client messages,
    determining, for each of the processed client messages, whether to apply said client message to said virtual device and whether to forward said client message to said at least one monitoring device, and
    depending on predetermined proxy rules, either (a) applying said client message to said virtual device and providing a response back to said at least one client device, or (b) forwarding said client message to said at least one monitoring device and providing a response back to said at least one client device.

2. The electrical power monitoring system of claim 1 in which at least certain of said messages include configuration changes for said at least one monitoring device, and said proxy server acknowledges said configuration changes but delays communication of said configuration changes to said at least one monitoring device until a later time based on the status of said at least one monitoring device.

3. The electrical power monitoring system of claim 2 in which said certain of said messages received from said at least one client device include a command for a log configuration change received from a first client device while a second client device is receiving data from that log, and said proxy server acknowledges said command for a log configuration change but does not transmit said command to the actual monitoring device to which said command is directed until said second client device has completed receiving data from said log.

4. The electrical power monitoring system of claim 1 in which said proxy server receives messages from multiple client devices for the same monitoring device, and manages the communication of said messages to said same monitoring device.

5. The electrical power monitoring system of claim 1 which includes at least one cache associated with said at least one monitoring devices for logging data generated by said at least one monitoring device, and in which said proxy server determines the type of message received from said at least one client device and, based on that determination, manages the communication of said message to said at least one monitoring device or to said at least one cache associated with said at least one monitoring device.

6. The electrical power monitoring system of claim 1 which includes at least one cache, and in which said proxy server determines whether messages received from said at least one client device are commands or requests for logged data, communicates commands directly to said at least one monitoring device, and communicates requests for logged data to said at least one cache.

7. The electrical power monitoring system of claim 1 in which said virtual device represents a continuously updating, virtual model of the measurement and configuration data state of said at least one monitoring device.

8. The electrical power monitoring system of claim 1 wherein said predetermined proxy rules include a rule that the only client requests forwarded to said at least one monitoring device are requests that are supported by said at least one monitoring device.

9. The electrical power monitoring system of claim 1 wherein said predetermined proxy rules include a rule that responses from said monitoring devices to said client requests are adjusted to be compatible with said at least one client device before being transmitted to said at least one client device.

10. The electrical power monitoring system of claim 1 wherein said predetermined proxy rules include a rule that client requests for historical trend data may be serviced by measurement data stored in said virtual device.

11. The electrical power monitoring system of claim 1 wherein said predetermined proxy rules include a rule that client requests may be serviced by said virtual device communicating directly with said at least one monitoring device if the state of said virtual device has not been updated within a predetermined amount of time.

12. The electrical power monitoring system of claim 1 wherein said predetermined proxy rules include a rule that if both primary and secondary monitoring devices are used at the same point, said virtual device will switch to said secondary monitoring device if predetermined conditions are met.

13. The electrical power monitoring system of claim 12 in which one of said predetermined conditions is receiving no response from said primary monitoring device after a prescribed number of attempts.

\* \* \* \* \*